United States Patent
Nagashima

(10) Patent No.: US 7,724,632 B2
(45) Date of Patent: May 25, 2010

(54) OPTICAL PICKUP DEVICE

(75) Inventor: Kenji Nagashima, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 700 days.

(21) Appl. No.: 11/637,817

(22) Filed: Dec. 13, 2006

(65) Prior Publication Data
US 2007/0133373 A1 Jun. 14, 2007

(30) Foreign Application Priority Data
Dec. 14, 2005 (JP) .............................. 2005-360799

(51) Int. Cl.
*G11B 7/00* (2006.01)
(52) U.S. Cl. ................................. 369/112.02
(58) Field of Classification Search ............. 369/112.02
See application file for complete search history.

(56) References Cited

U.S. PATENT DOCUMENTS

| | | | | |
|---|---|---|---|---|
| 6,625,102 | B1 * | 9/2003 | Hashimoto | 369/112.16 |
| 6,628,589 | B2 * | 9/2003 | Iwasaki et al. | 369/53.19 |
| 7,054,253 | B1 * | 5/2006 | Nomura et al. | 369/112.02 |
| 7,123,565 | B2 * | 10/2006 | Ariyoshi et al. | 369/53.22 |
| 7,499,386 | B2 * | 3/2009 | Ogasawara | 369/53.2 |
| 7,542,397 | B2 * | 6/2009 | Ogasawara et al. | 369/112.02 |
| 2005/0047311 | A1 * | 3/2005 | Sato et al. | 369/112.02 |

FOREIGN PATENT DOCUMENTS

| | | |
|---|---|---|
| DE | 196 54 673 A1 | 7/1997 |
| DE | 699 05 622 T2 | 12/2003 |
| DE | 697 22 951 T2 | 5/2004 |
| EP | 1 560 209 A1 | 8/2005 |
| EP | 1 562 187 A2 | 8/2005 |
| EP | 1 605 449 A2 | 12/2005 |
| EP | 1 605 450 A2 | 12/2005 |
| JP | A-2005-071424 | 3/2005 |

* cited by examiner

*Primary Examiner*—Wayne R Young
*Assistant Examiner*—Adam R Giesy
(74) *Attorney, Agent, or Firm*—Morgan Lewis & Bockius LLP

(57) ABSTRACT

An optical pickup device includes a liquid crystal element having transparent electrodes, one of which has a plurality of areas divided in a concentric manner. The liquid crystal element can compensate for a spherical aberration that is generated when information is reproduced or recorded on two types of optical recording media. When one of two light beams supporting the two types of optical recording media having a larger value of an effective diameter is a first light beam and the other having a smaller value is a second light beam, parts of areas located inside an effective diameter of the second light beam and areas located outside the same to which the same voltage is applied for compensating for a spherical aberration generated in the first light beam are connected electrically to be the same potential.

8 Claims, 7 Drawing Sheets

Fig. 5

| class of area formed on transparent electrode | | radius area of concentric circles (mm) | electrode number of control circuit of liquid crystal element | phase(wavelength) generated when spherical aberrations is compensated (in the case of a CD) | phase(wavelength) generated when spherical aberrations is compensated (in the case of a DVD) |
|---|---|---|---|---|---|
| 13a | R-6 | 0~0.35 | ① | 0 | 0 |
| 13b | R-5 | 0.35~0.51 | ② | -0.165 | -0.14 |
| 13c | R-4 | 0.51~0.66 | ③ | -0.33 | -0.31 |
| 13d | R-3 | 0.66~0.85 | ④ | -0.495 | -0.56 |
| 13e | R-2 | 0.85~1.11 | ⑤ | -0.66 | -0.83 |
| 13f | R-1 | 1.11~1.25 | ⑥ | -0.495 | -0.05 |
| 13g | R | 1.25~1.33 | ⑦ | -0.24 | -0.1 |
| 13h | R | 1.33~1.38 | ⑧ | 0 | -0.1 |
| 13i | R+1 | 1.38~1.5 | ⑥ | -0.495 | -0.05 |
| 13j | R+2 | 1.5~1.63 | ⑤ | -0.66 | -0.83 |
| 13k | R+3 | 1.63~1.7 | ④ | -0.495 | -0.56 |
| 13l | R+4 | 1.7~1.74 | ③ | -0.33 | -0.31 |
| 13m | R+5 | 1.74~1.78 | ② | -0.165 | -0.14 |
| 13n | R+6 | 1.78~1.81 | ① | 0 | 0 |

OPTICAL PICKUP DEVICE

This application is based on Japanese Patent Application No. 2005-360799 filed on Dec. 14, 2005, the contents of which are hereby incorporated by reference.

BACKGROUND OF THE INVENTION

1. Field of the Invention

The present invention relates to an optical pickup device for reproducing and recording information on an optical recording medium by projecting a light beam toward the optical recording medium. In particular, the present invention relates to reductions of size and cost of the optical pickup device having a liquid crystal element for compensating for a wave aberration.

2. Description of Related Art

Recent years, optical recording medium such as a compact disk (hereinafter referred to as a CD) or a digital versatile disk (hereinafter referred to as a DVD) has become commonplace and is used widely. Furthermore, in order to increase a quantity of information recorded on the optical recording medium, researches on the high density of the optical recording medium are being carried on. For example, a high density optical recording medium such as an HD-DVD or a Blu-Ray Disk (Registered Trademark; hereinafter referred to as a BD) is being available as a high quality DVD.

When information is reproduced or recorded on the optical recording medium, the optical pickup device is used for projecting a light beam toward the optical recording medium so that information can be recorded or be reproduced. The optical pickup device includes an objective lens having an appropriate numerical aperture (NA) and a light source having an appropriate wavelength in accordance with the type of the optical recording medium. For example, the objective lens for the CD has an NA of 0.50, and the light source for a CD has a wavelength of 780 nm. The objective lens for the DVD has an NA of 0.65, and the light source for the DVD has a wavelength of 650 nm. The objective lens from the HD-DVD has an NA of 0.65, and the light source for the HD-DVD has a wavelength of 405 nm. The objective lens for the BD has an NA of 0.85, and the light source has a wavelength of 405 nm.

Since the NA of the objective lens as well as the wavelength varies in accordance with the type of the optical recording medium as described above, different optical pickup devices may be used for different optical recording media. However, it is more convenient if a single optical pickup device can read or record information on a plurality of types of optical recording media. Such optical pickup devices have been developed in quantity. Among them, there is an optical pickup device disclosed in JP-A-2005-71424, for example, in which a single objective lens is used for reproducing and recording information on a plurality of types of optical recording media.

When supporting a plurality of types of optical recording media by using a single objective lens, even if the objective lens is adjusted so that a spherical aberration is not generated in one type of the optical recording medium for example, the spherical aberration may be generated when reproducing or recording information on other types of the optical recording media. Therefore, as shown in JP-A-2005-71424, it is common to arrange a liquid crystal panel in the optical pickup device and to control the voltage that is applied to the liquid crystal panel so that the spherical aberration is compensated. As the liquid crystal panel that is disposed for this purpose, a following type is described in JP-A-2005-71424 and other many documents, for example. In the type, a transparent electrode constituting the liquid crystal panel is divided into a plurality of areas in a concentric manner, and voltages applied to the areas are controlled so that the spherical aberration is compensated.

However, when the above-mentioned liquid crystal panel is used, it is necessary to increase the number of division of the concentric areas of the transparent electrode in order to compensate for the aberrations that are generated for the plurality of types of optical recording media. As a result, the number of electrodes and the number of wiring connections provided to the circuit board for controlling the liquid crystal panel are increased, and a size as well as a manufacturing cost of the optical pickup device is increased. Concerning this point, it is possible not to compensate for the aberration of the plurality of types of optical recording media completely but to compensate in general for the aberrations so that the number of electrodes provided to the circuit board can be reduced to a certain number, but there is a limitation in the reduction.

In addition, it is possible to reduce the number of electrodes and the number of wiring connections provided to the circuit board for controlling the liquid crystal panel by using a segment type liquid crystal panel that includes a plurality of transparent electrodes having a low resistance arranged in concentric manner and has neighboring electrodes connected to each other via a resister element having the same material as the transparent electrode, or by using a gradation type liquid crystal panel having a plurality of concentric electrodes having a low resistance on a transparent electrode of high resistance that is not divided, as shown in JP-A-2005-71424. In the case where this structure is adopted, however, the structure of the liquid crystal panel will become complicated in the first place. Furthermore, a manufacturing cost of the liquid crystal panel will be increased.

SUMMARY OF THE INVENTION

An object of the present invention is to provide an optical pickup device that can read and record information on a plurality of types of optical recording media and includes a liquid crystal element for compensating for spherical aberrations, which can reduce the number of electrodes provided to a circuit board for controlling the liquid crystal element and reduce the number of wiring connections for downsizing the device and reducing manufacturing cost.

An optical pickup device according to the present invention includes a light source, a condenser lens for condensing a light beam emitted from the light source onto a recording surface of an optical recording medium, and a liquid crystal element that is placed between the light source and the condenser lens and has liquid crystal and transparent electrodes arranged so as to sandwich the liquid crystal. At least one of the transparent electrodes is divided into a plurality of areas in a concentric manner. A voltage applied to each of the plurality of areas is adjusted so that the liquid crystal element compensates for spherical aberrations generated in two light beams having different effective diameters on the condenser lens. It is supposed that a first light beam is one of the two light beams having a larger value of the effective diameter, a second light beam is the other having a smaller value of the same, a first spherical aberration is the spherical aberration generated in the first light beam, and a second spherical aberration is the spherical aberration generated in the second light beam, respectively. Then, among the plurality of areas, an inside area and an outside area with respect to the effective diameter of the second light beam are connected electrically so as to have the same potential if a same voltage can be applied to the inside and outside areas when the first spherical aberration is compensated. Here, the "effective diameter" is a concept expressing a diameter on the condenser lens that contributes to imaging of a beam spot formed on the optical recording medium for reproducing and recording information. The same holds true in the following description.

According to this structure, the optical pickup device includes the liquid crystal element having the transparent electrode that is divided into a plurality of areas in a concentric manner so that spherical aberrations generated in two light beams having different effective diameters can be compensated. Since some areas among the plurality of areas formed in a concentric manner are connected electrically so as to have the same potential, the number of electrodes provided to the circuit board for controlling the liquid crystal element can be reduced to a value smaller than the number of areas formed in the transparent electrode. Thus, the number of wiring connections provided to the circuit board for controlling the liquid crystal element can also be reduced, so that downsizing and the cost reduction of the optical pickup device can be realized.

Furthermore, according to the present invention, in the optical pickup device having the above-mentioned structure, a reference area R is at least one area to which a constant voltage is applied for compensating for a part including a maximum value of the first spherical aberration, an R−n area is a n-th (n=1, 2, . . . ) area located inward from the reference area R, and an R+n area is a n-th (n=1, 2, . . . ) area located outward from the reference area R among the plurality of areas. Then, the plurality of areas is formed so that the first spherical aberration can be compensated by controlling a voltage that is applied to the plurality of areas so that the R−n area and the R+n area have the same voltage value, and that the second spherical aberration can be compensated by applying an optimal voltage to each of the areas located inside the effective diameter of the second light beam.

According to this structure, since a pattern of the plurality of areas formed on the transparent electrode is determined so that the number of sets connected electrically to have the same potential is increased, the number of electrodes and wiring connections provided to the circuit board for controlling the liquid crystal element can be reduced substantially, so the optical pickup device can be downsized.

Furthermore, according to the present invention, in the optical pickup device having the above-mentioned structure, the light source has two or three different wavelengths, and the condenser lens is adjusted so that a spherical aberration of another light beam that is different from the two light beams and has the shortest wavelength among light emitted from the light source and has a maximum value of the effective diameter becomes substantially zero.

According to this structure, since the objective lens is designed in advance so that no aberration is generated in a light beam for which compensation for the aberration is relatively difficult, the structure of the liquid crystal element can be simplified relatively.

Furthermore, according to the present invention, in the optical pickup device having the above-mentioned structure, electrodes for supplying electricity are not provided to the area in which values of applied voltages for compensating for the first and the second spherical aberrations are both zero and an area located outside the effective diameter of the second light beam in which a value of an applied voltage for compensating for the first spherical aberration is zero among the plurality of areas.

According to this structure, the number of electrodes provided to the circuit board for controlling the liquid crystal element can be reduced further.

BRIEF DESCRIPTION OF THE DRAWINGS

FIG. 5 is a table showing data about a plurality of areas formed on the transparent electrode of the liquid crystal element.

DESCRIPTION OF THE PREFERRED EMBODIMENTS

Now, an embodiment of the present invention will be described with reference to the attached drawings. The embodiment shown here is merely an example, so the present invention is not limited to the embodiment shown here.

Figure 1:
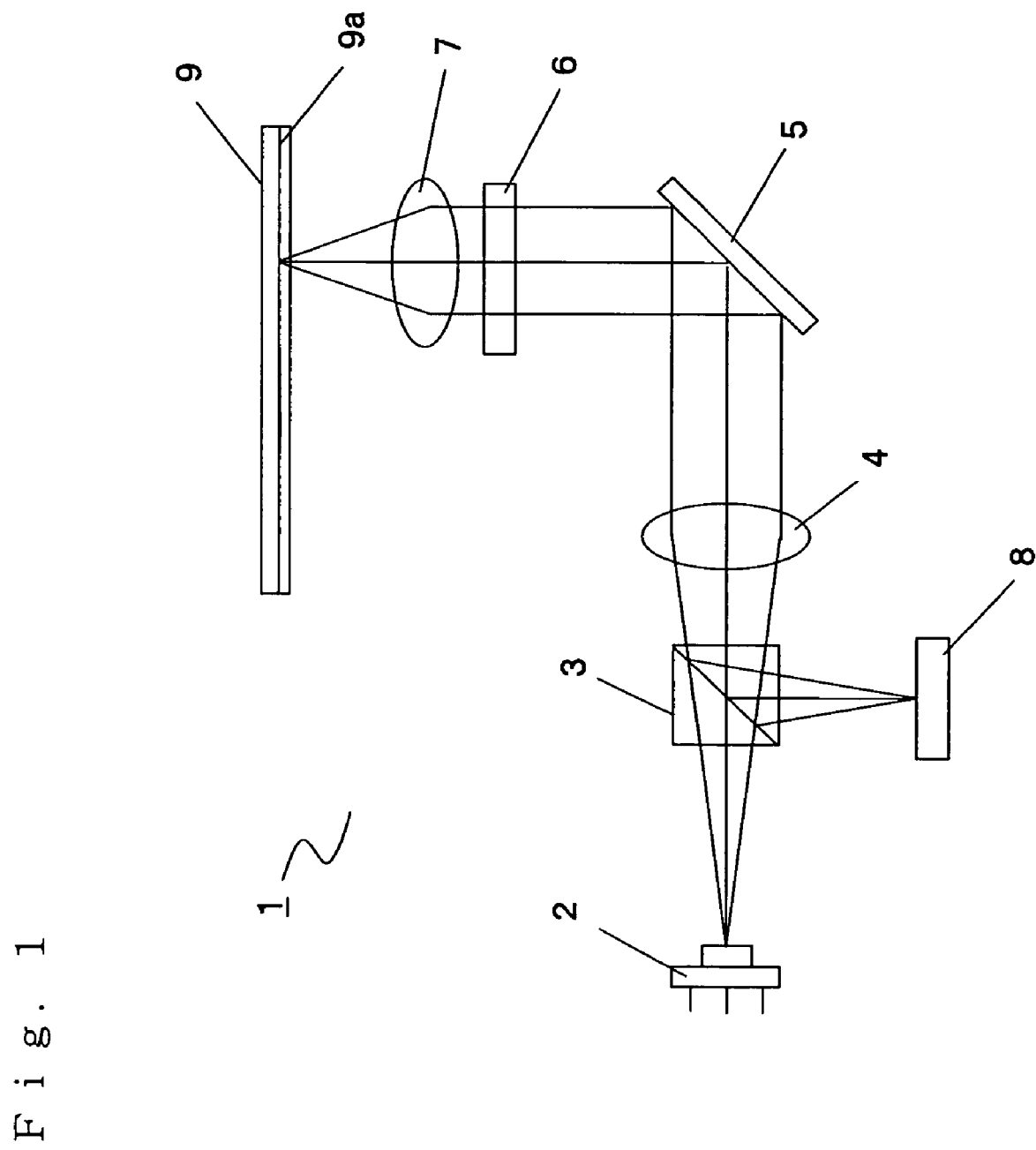
FIG. 1 is a schematic diagram showing a structure of an optical system of an optical pickup device according to the present embodiment.

FIG. 1 is a schematic diagram showing a structure of an optical system of an optical pickup device according to the present embodiment. In FIG. 1, numeral 1 denotes an optical pickup device that can read information recorded on a recording surface 9a of an optical recording medium 9 of three types including a CD, a DVD and a BD by projecting a light beam toward the optical recording medium 9 and receiving its reflected light and can write information on the recording surface 9a by projecting a light beam toward the optical recording medium 9. An optical system of this optical pickup device 1 includes a light source 2, a beam splitter 3, a collimator lens 4, a total reflection mirror 5, a liquid crystal element 6, an objective lens 7 and a photo detector 8. Hereinafter the optical elements will be described in detail.

The light source 2 is a three-wavelength integrated laser diode that has three light emission points for working as three light sources. More specifically, the light source 2 can emit a light beam of the 780 nm band for a CD, a light beam of the 650 nm band for a DVD and a light beam of the 405 nm band for a BD. Although the three-wavelength integrated laser diode is used as the light source in the present embodiment, the present invention is not limited to this structure. For example, it is possible to use three types of laser diodes arranged at different positions.

The beam splitter 3 works as a light splitting element for splitting an incident light beam. The beam splitter 3 permits the light beam emitted from the light source 2 to pass through and leads the light beam to the optical recording medium 9, while it reflects light reflected by the optical recording medium 9 and leads the reflected light to the photo detector 8. The light beam passes through the beam splitter 3 and is sent to the collimator lens 4.

The collimator lens 4 converts the light beam that has passed through the beam splitter 3 into parallel rays. The parallel rays that have passed the collimator lens 4 are sent to the total reflection mirror 5.

The total reflection mirror 5 reflects totally the light beam as the parallel rays that have passed the collimator lens 4, and an optical axis thereof is perpendicular to the recording surface 9a of the optical recording medium 9. Note that the total reflection mirror 5 is tilted by 45° with respect to the optical axis of the light beam emitted from the light source 2. The light beam reflected by the total reflection mirror 5 is sent to the liquid crystal element 6.

The liquid crystal element 6 controls a variation of the refractive constant by utilizing a characteristic of the liquid crystal that liquid crystal molecules change orientation when a voltage is applied to liquid crystal sandwiched by the transparent electrodes (not shown) so that a phase of a light beam that passes through the liquid crystal element 6 can be controlled. When this liquid crystal element 6 is arranged, the spherical aberration that is generated due to a variation of thickness of a protection layer that protects the recording surface 9a of the optical recording medium 9 can be compensated. In the present embodiment, the spherical aberration can be compensated for light beams emitted from the light sources for a CD and for a DVD. Note that a detail of the liquid crystal element 6 will be described later.

The objective lens (condenser lens) 7 condenses the light beam that passed the liquid crystal element 6 onto the recording surface 9a of the optical recording medium 9. The objective lens 7 in the present embodiment is designed so that the spherical aberration is not generated in the light beam emitted from the light source for a BD. Note that the liquid crystal element 6 and the objective lens 7 are mounted on an actuator (not shown) of the objective lens in the present embodiment. By structuring in this way, it is possible to prevent the generation of the comatic aberration due to shifts of optical axes of the objective lens 7 and the liquid crystal element 6. However, it is not always required to mount the liquid crystal element 6 on the actuator of the objective lens, but other structures are possible.

The light beam reflected by the optical recording medium 9 passes through the objective lens 7 and the liquid crystal element 6, is reflected by the total reflection mirror 5, passes through the collimator lens 4, is reflected by the beam splitter 3 and is focused on the light reception portion (not shown) of the photo detector 8.

The photo detector 8 converts the received light information into an electrical signal and outputs the signal to an RF amplifier (not shown) or the like, for example. Then, this electrical signal is used as a reproduction signal of data recorded on the recording surface 9a and a servo signal for performing a focus control and a tracking control.

Figure 2:
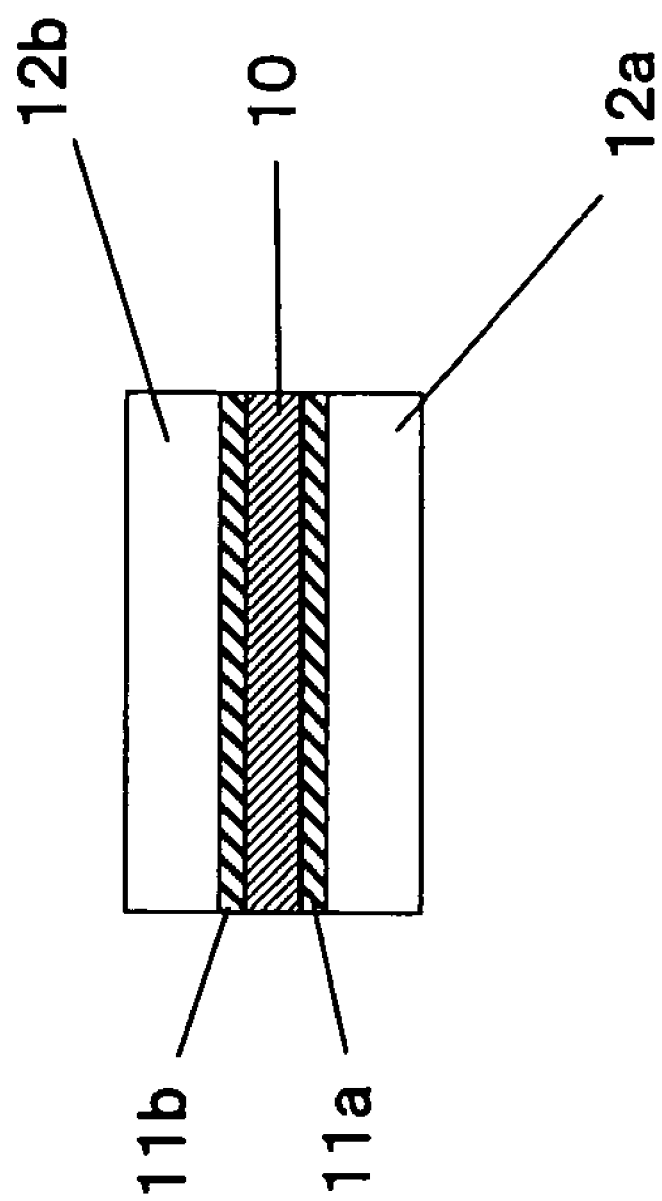
FIG. 2 is a schematic cross section of a liquid crystal element provided to an optical pickup device of the present embodiment.

Next, a detailed structure of the liquid crystal element 6 provided to the optical pickup device 1 according to the present embodiment will be described. FIG. 2 is a schematic cross section of the liquid crystal element 6 provided to the optical pickup device 1 of the present embodiment. As shown in FIG. 2, the liquid crystal element 6 is formed by sandwiching a liquid crystal 10 with two transparent electrodes 11a and 11b arranged to face each other and by sandwiching the outsides of the transparent electrodes 11a and 11b with glass plates 12a and 12b at the part that is formed with the transparent electrodes 11a and 11b and the liquid crystal 10.

Figure 3:
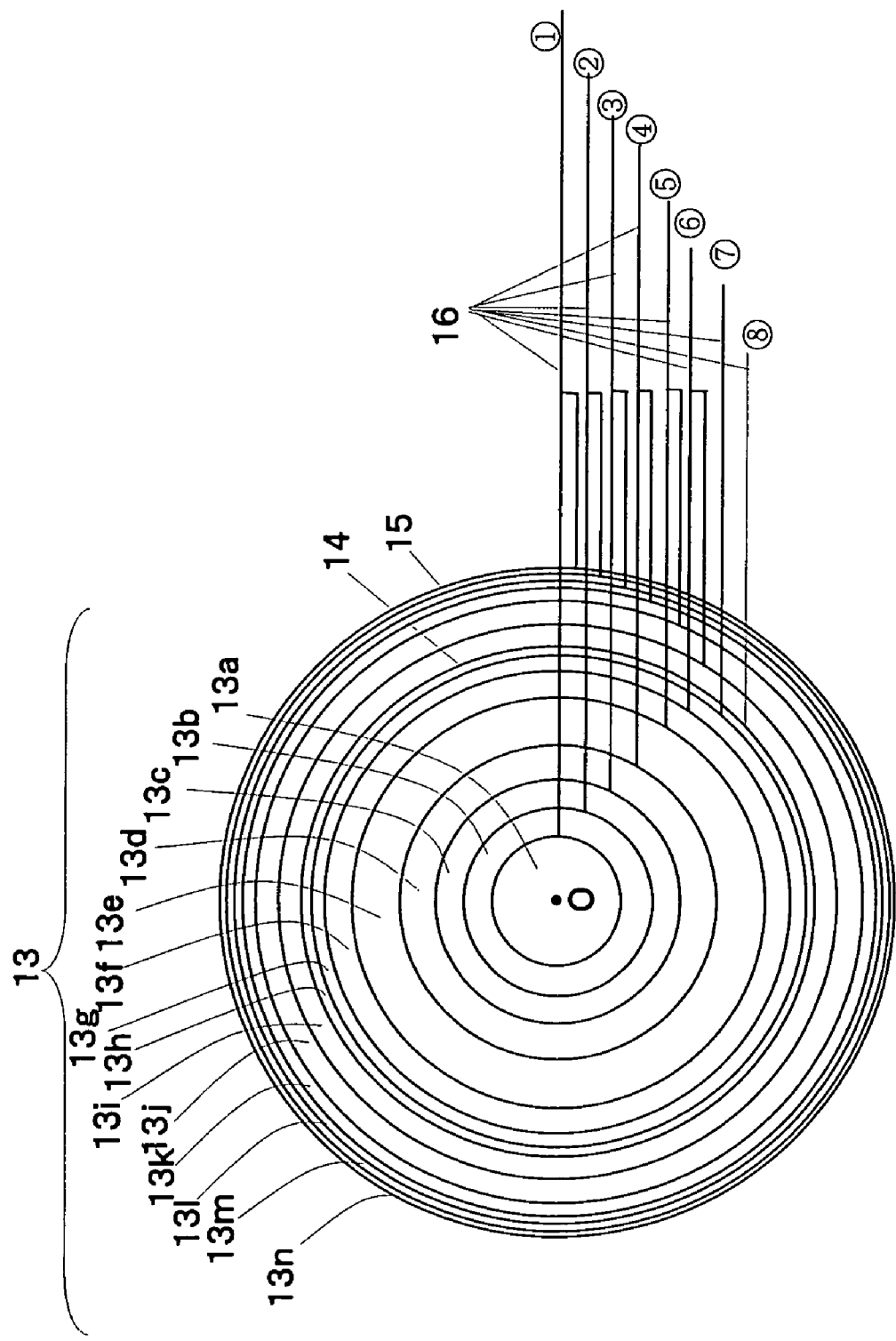
FIG. 3 is a schematic diagram showing a pattern formed on a transparent electrode of a liquid crystal element according to the present embodiment.

FIG. 3 is a schematic diagram showing a pattern formed on the transparent electrode 11a. As shown in FIG. 3, one of the transparent electrodes 11a of the liquid crystal element 6 forms a pattern divided into a plurality of areas 13 in a concentric manner. On the other hand, the other transparent electrode 11b is not divided but forms a single electrode (a common electrode). Although one of the transparent electrodes 11a and 11b forms the divided electrodes while the other is not divided in the present embodiment, the present invention is not limited to this. It is possible to form the divided patterns on both the transparent electrodes 11a and 11b.

However, if both the transparent electrodes 11a and 11b are divided electrodes, the number of electrodes and wiring connections necessary for supplying power to the transparent electrodes 11a and 11b may increase. Therefore, it is preferable that only one of the transparent electrodes 11a and 11b is divided while the other is a common electrode for the purpose of avoiding an increase of size of the device.

Figure 4:
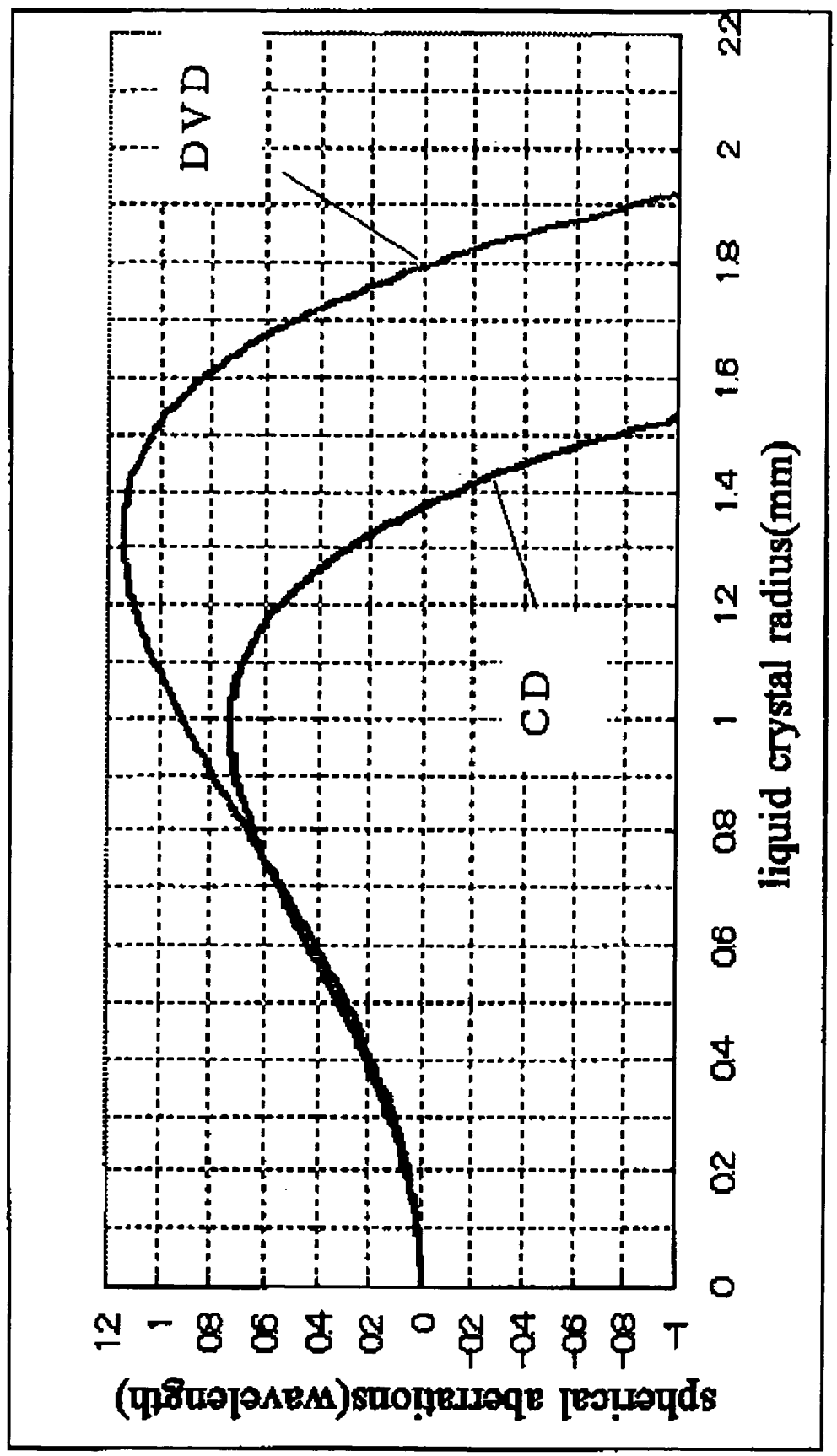
FIG. 4 is a graph showing relationships between a distance from a center of the transparent electrode divided in a concentric manner and spherical aberrations generated in light beams emitted from light sources for a CD and for a DVD.

The plurality of areas 13 divided in a concentric manner on the transparent electrode 11a is made up of fourteen areas 13a-13n. In the present embodiment, the number of areas 13a-13n and sizes of areas are determined by the following method. FIG. 4 is a graph showing relationships between a distance (liquid crystal radius) from a center O (see FIG. 3) of the transparent electrode 11a divided in a concentric manner and spherical aberrations generated in light beams emitted from light sources for a CD and for a DVD (hereinafter referred to as a light beam for a CD or a light beam for a DVD as to each light beam). In order to compensate for these spherical aberrations, it is necessary to adjust a voltage that is applied across the transparent electrodes 11a and 11b so that the liquid crystal element 6 generates a waveform distribution having a phase opposite to a distribution of the spherical aberration.

In this case, it is necessary to compensate for both the spherical aberrations generated in the light beams for a CD and for a DVD. In order to compensate for both the spherical aberrations appropriately to a certain extent even though not completely, the number of the areas 13 formed by dividing the transparent electrode 11a will increase to a certain number. However, if the number of dividing the transparent electrode 11a increases as described above, the number of electrodes and the number of wiring connections provided to the circuit board (not shown) for controlling the liquid crystal element 6 increases, so that a size of the circuit board as well as the pickup device 1 will be increased.

Considering this point, in the present embodiment, a pattern of the area 13 is determined so that the number of electrodes and the number of wiring connections provided to the circuit board for controlling the liquid crystal element 6 can be reduced. The light beams for a CD and for a DVD have different effective diameters. More specifically, as shown in FIG. 3, an effective diameter of the light beam for a DVD (an effective diameter for the first light beam) 15 is larger than an effective diameter of the light beam for a CD (an effective diameter of the second light beam) 14. Therefore, when the spherical aberration is compensated, a range of controlling the phase by the liquid crystal becomes narrower in the case of a CD and wider in the case of a DVD.

Therefore, as to the areas that are used for the compensation for spherical aberrations in the cases of a CD and a DVD, i.e., the areas located inside the effective diameter 14 of the CD (corresponding to the area 13a-13h in the present embodiment), it is necessary that voltages can be adjusted individually for each of the areas so that the spherical aberration can be compensated in both the cases of a CD and a DVD. However, as to the areas outside the effective diameter 14 (corresponding to the area 13i-13n in the present embodiment), it is sufficient if the applied voltage can be adjusted so that only the spherical aberration can be compensated only in the case of a DVD.

Therefore, the area outside the effective diameter 14 where the same voltage as the voltage for the area inside the effective diameter 14 can be applied for compensating for the spherical aberration generated in the light beam for a DVD, can be connected electrically to have the same potential as the inside area where the same voltage can be applied. Thus, a single electrode is sufficient for supplying electricity to the areas that are connected to be the same potential. Accordingly, it is possible to reduce the number of electrodes that are provided to the circuit board for controlling the liquid crystal element 6.

Considering this point, in the present embodiment, a pattern of the area 13 is determined so that the number of sets having the same voltage to be applied for compensating for the spherical aberration generated in the light beam for a DVD in the inside area and the outside area of the effective diameter 14 increases. More specifically, it is supposed that in the area 13 the area to which a constant voltage is applied for compensating for the spherical aberration of a part where the spherical aberration generated in the light beam for a DVD becomes the maximum value is a reference area R (corresponding to the areas 13g and 13h in the present embodiment), an R−n area is a n-th (n=1, 2, . . . ) area located inward from the reference area R, and an R+n area is a n-th (n=1, 2, . . . ) area located outward from the reference area R. Then, a voltage is applied so that the R−n area and the R+n area have the same voltage.

Then, under the precondition of the voltage to be applied to the area 13 as described above, a simulation is performed for determining a pattern of the area 13 so that the spherical aberration generated in the light beam for a DVD becomes the minimum value, i.e., so as to be similar most to the waveform distribution of the opposite phase to a distribution of the spherical aberration generated in the light beam for a DVD. In this case, however, compensation for the spherical aberration generated in the light beam for a CD is not considered at all. Therefore, there is a case where the spherical aberration generated in the light beam for a CD cannot be compensated.

Therefore, based on an area pattern obtained by the simulation for a DVD, it is necessary to simulate so that the spherical aberration generated in the light beam for a CD can also be compensated. In the present embodiment, even if the phase generated in each of the areas inside the effective diameter 14 of the light beam for a CD is adjusted among the area patterns obtained by the above-mentioned simulation for a DVD, the spherical aberration generated in the light beam for a CD cannot be compensated appropriately. Therefore, the reference area R that is not required to be divided into two areas for compensating for the spherical aberration generated in the light beam for a DVD is divided into two areas (areas 13g and 13h).

Thus, as to the plurality of areas 13 formed on the transparent electrode 11a, the precondition of applying the same voltage to the R−n area and the R+n area for compensating for the spherical aberration generated in the light beam for a DVD is maintained while realizing the structure for compensating for the spherical aberration generated in the light beam for a CD by applying an optimal voltage to each of the areas 13a-13h located inside an effective diameter 14d.

Note that the reference area R is divided into two areas because the area pattern obtained by the simulation for a DVD cannot compensate appropriately for the spherical aberration generated in the light beam for a CD in the present embodiment. However, the present invention is not limited to this structure. It is possible to make the reference area R as a single area or divide it into three or more areas in accordance with the generated quantity of the spherical aberration due to a structure or the like of the optical system.

Figure 6:
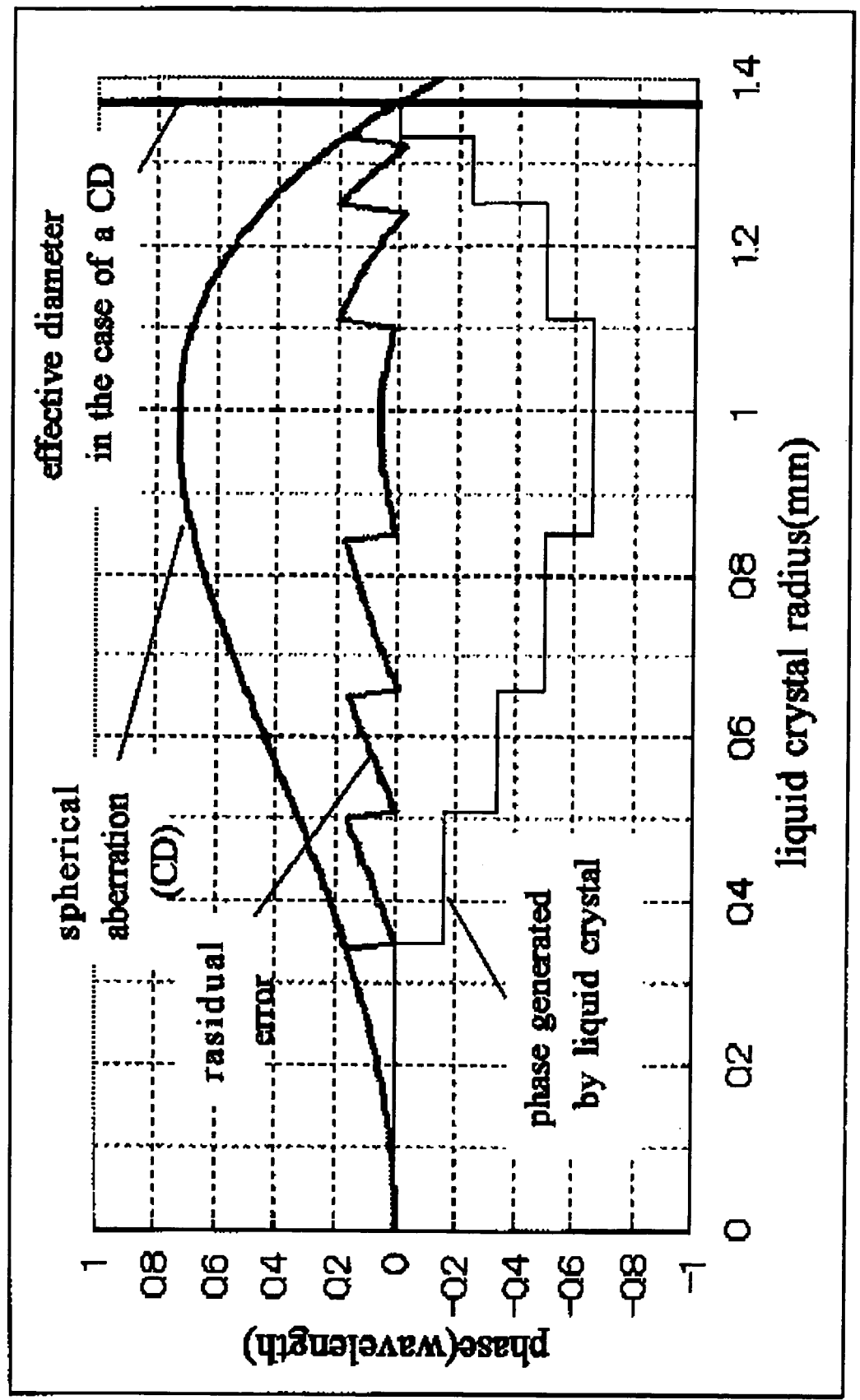
FIG. 6 is a graph showing a state in which a spherical aberration generated in the light beam emitted from the light source for a CD is compensated by the liquid crystal element according to the present embodiment.
Figure 7:
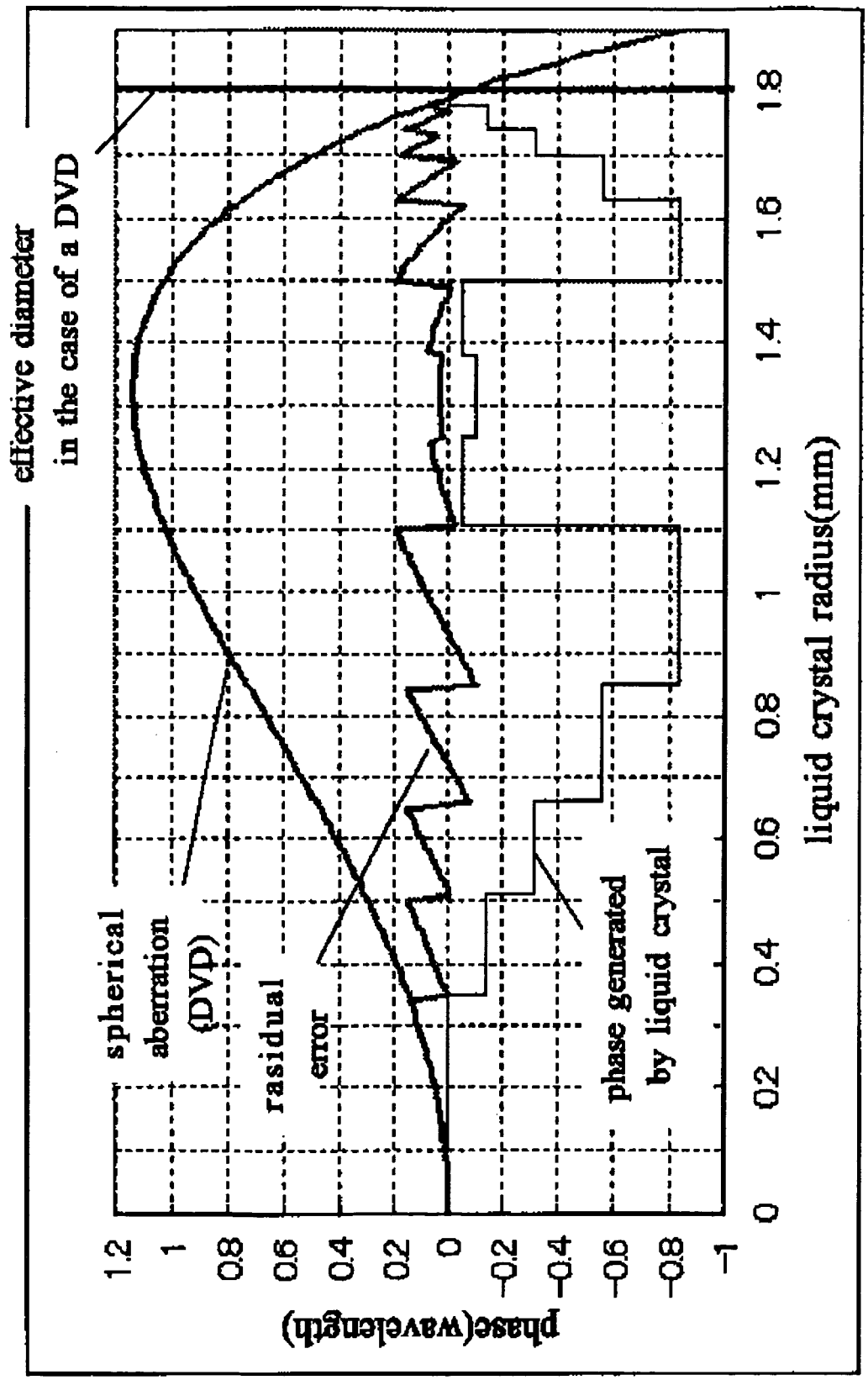
FIG. 7 is a graph showing a state in which a spherical aberration generated in the light beam emitted from the light source for a DVD is compensated by the liquid crystal element according to the present embodiment.

FIG. 5 is a table showing numerical data about the areas 13a-13n. Here, a radius area of concentric circles describes an inner radius and an outer radius of the concentric circles surrounding each of the areas 13a-13n. The result of the compensation for the spherical aberration generated in the light beams for a CD and for a DVD by using the liquid crystal element 6 having the concentric areas 13a-13n formed as described above is shown in FIGS. 6 and 7. In FIGS. 6 and 7, a residual error indicates a phase pattern that remains when a phase pattern generated by applying the voltage to the liquid crystal element 6 is added to a phase pattern of the spherical aberration (a phase pattern after the compensation). If the pattern of the residual error becomes smaller than a quarter of the wavelength, the spherical aberration is compensated appropriately.

Note that the phase generated between the liquid crystal radius 1.1-1.5 mm of the liquid crystal element 6 (corresponding to the areas 13f-13i) is seemed insufficient for compensating for the spherical aberration generated in this area in FIG. 7. This is because that the phase is shifted by one wavelength from the phase to be generated originally (−1.05 wavelengths in the areas 13f and 13i; −1.1 wavelengths in the areas 13g and 13h) considering that the same effect is obtained in the phase compensation even if the wavelength is shifted by one wavelength. In this way, a maximum value of the applied voltage necessary for driving the liquid crystal element 6 can be lowered, so that a load on the optical pickup device 1 can be reduced.

As described above, the optical pickup device 1 according to the present embodiment can compensate for the spherical aberration generated in the light beams for a CD and for a DVD appropriately. In addition, the number of electrodes provided to the circuit board for controlling the liquid crystal element 6 that is driven for compensating for the spherical aberration can be reduced to eight by six from fourteen that is the number of the areas 13a-13n obtained when the transparent electrode 11a of the liquid crystal element 6 is divided (FIGS. 3 and 5). More specifically, the areas 13a and 13n, the areas 13b and 13m, the areas 13c and 13l, the areas 13d and 13k, the areas 13e and 13j, and the areas 13f and 13i are connected electrically to be the same potential as each other.

In this case, not only the number of electrodes of the circuit board for controlling the liquid crystal element 6 but also the number of wiring connections can be reduced. Therefore, a size of the circuit board for controlling the liquid crystal element 6 can be reduced, so that a small size of the optical pickup device 1 can be realized. In FIG. 3, numeral 16 denotes wiring connections, and the numeral shown at an end of each wiring connection corresponds to an electrode number that is provided to the circuit board for controlling the liquid crystal element 6.

The structure of the plurality of areas 13 (the sizes and the number of areas) is not limited to the above-mentioned structure of the present embodiment. The structure can be modified variously within the scope of the object of present invention. For example, the same voltage is applied to the R−n (n=1, 2, 3, 4, 5 and 6) area and the R+n (n=1, 2, 3, 4, 5 and 6) area when the spherical aberration generated in the light beam for a DVD is compensated in the present embodiment (see FIG. 5). However, it is possible to apply the same voltage to the areas of n=1 through n=3 and not to apply the same voltage to the areas of n=4 through n=6 concerning the values of n described above.

However, it is preferable to structure the area 13 so as to increase the number of areas to which the same voltage is applied for compensating for the spherical aberration generated in the light beam for a DVD in the areas inside and outside the effective diameter 14 of the light beam for a CD, for the purpose of decreasing the number of electrodes necessary for the circuit board for controlling the liquid crystal element 6 as much as possible.

Furthermore, in the present embodiment, the area 13a in which the voltages to be applied for compensating for the spherical aberrations generated in the light beams for a CD and for a DVD become both zero and the area 13n outside the effective diameter 14 of the light beam for a CD in which the voltage to be applied for compensating for the spherical aberration generated in the light beam for a DVD becomes zero are connected to the electrode of the circuit board for controlling the liquid crystal element 6. However, it is possible to make a structure in which electrodes are not provided corresponding to the areas 13a and 13n, and not to connect the circuit board for controlling the liquid crystal element 6 with the areas 13a and 13n. In this way, it is possible to reduce further the number of electrodes and the number of wiring connections necessary for the circuit board for controlling the liquid crystal element 6.

In addition, the objective lens 7 of the optical pickup device 1 in the present embodiment is designed so that no spherical aberration is generated in the light beam for a BD and that the spherical aberrations generated in the light beams for a CD and for a DVD are compensated by the liquid crystal element 6. However, the present invention is not limited to this structure. For example, it is possible to make a structure in which the objective lens 7 is designed so that no spherical aberration is generated in the light beam for a DVD and that the spherical aberrations generated in the light beams for a CD and for a BD are compensated by the liquid crystal element 6.

Furthermore, as the optical pickup device 1 of the present embodiment, a structure of an optical pickup device that supports three optical recording media including a CD, a DVD and a BD is described. However, a range of application of the present invention is not limited to this, but it can be changed variously within the scope of the object of the present invention. For example, it is possible to make a structure in which three optical recording media including a CD, a DVD and an HD-DVD are supported, the objective lens 7 is designed so that no spherical aberration is generated in the light beam for an HD-DVD, and the spherical aberrations generated in the light beams for a CD and for a DVD are compensated by the liquid crystal element 6. It is also possible to make a structure in which three optical recording media including a BD, an HD-DVD and a CD are supported, the objective lens 7 is designed so that no spherical aberration is generated in the light beam for a light beam for a BD, and the spherical aberrations generated in the light beams for a CD and for an HD-DVD are compensated by the liquid crystal element 6.

In addition, it is possible to make a structure in which two optical recording media including a DVD and a BD are supported, the objective lens 7 is not adjusted so that no spherical aberration is generated in the light beam for an light beam for any optical recording media, and the spherical aberrations generated in the light beams for a DVD and for a BD are compensated by the liquid crystal element 6.

According to the optical pickup device of the present invention, it is possible to reduce the number of electrodes provided to the liquid crystal element for compensating for the spherical aberration. Therefore, the number of wiring connections and the number of electrodes of the circuit board for controlling the liquid crystal element can be reduced, and the circuit board can be downsized. As a result, a small size and a low cost of the optical pickup device can be realized.

What is claimed is:

1. An optical pickup device comprising:
    a light source;
    a condenser lens for condensing a light beam emitted from the light source onto the recording surface of an optical recording medium; and
    a liquid crystal element including liquid crystal and transparent electrodes arranged in a manner sandwiching the liquid crystal, the liquid crystal element being disposed between the light source and the condenser lens, wherein
    the liquid crystal element is disposed for compensating for spherical aberrations generated in two light beams having different wavelengths from each other and different effective diameters on the condenser lens from each other,
    at least one of the transparent electrodes of the liquid crystal element is divided into a plurality of areas in a concentric manner, so that a voltage is individually applied to each of the plurality of areas; and
    when a first light beam is one of the two light beams having a larger value of the effective diameter, a second light beam is the other having a smaller value of the same, and the spherical aberration generated in the first and the second light beams are first and second spherical aberrations, respectively, among the plurality of areas, areas that are located inside and outside the effective diameter of the second light beam, and between which a same voltage can be applied when the first spherical aberration is compensated are connected electrically so as to have the same potential.

2. The optical pickup device according to claim 1, wherein when a reference area R is at least one area to which a constant voltage is applied for compensating for a part including a maximum value of the first spherical aberration, an R−n area is a n-th (n=1, 2, . . . ) area located inward from the reference area R, and an R+n area is a n-th (n=1, 2, . . . ) area located outward from the reference area R among the plurality of areas, the plurality of areas is formed so that the first spherical aberration can be compensated by controlling a voltage that is applied to the plurality of areas so that the R−n area and the R+n area have the same voltage value, and that the second spherical aberration can be compensated by applying an optimal voltage to each of the areas located inside the effective diameter of the second light beam.

3. The optical pickup device according to claim 1, wherein the light source has two or three different wavelengths, and the condenser lens is adjusted so that a spherical aberration of another light beam that is different from the two light beams and has the shortest wavelength among light emitted from the light source and has a maximum value of the effective diameter becomes substantially zero.

4. The optical pickup device according to claim 1, wherein electrodes for supplying electricity are not provided to an area in which values of applied voltages for compensating for the first and the second spherical aberrations are both zero and an area located outside the effective diameter of the second light beam in which a value of an applied voltage for compensating for the first spherical aberration is zero among the plurality of areas.

5. The optical pickup device according to claim 2, wherein the light source has two or three different wavelengths, and the condenser lens is adjusted so that a spherical aberration of another light beam that is different from the two light beams and has the shortest wavelength among light emitted from the light source and has a maximum value of the effective diameter becomes substantially zero.

6. The optical pickup device according to claim 2, wherein electrodes for supplying electricity are not provided to an area in which values of applied voltages for compensating for the first and the second spherical aberrations are both zero and an area located outside the effective diameter of the second light beam in which a value of an applied voltage for compensating for the first spherical aberration is zero among the plurality of areas.

7. The optical pickup device according to claim 3, wherein electrodes for supplying electricity are not provided to an area in which values of applied voltages for compensating for the first and the second spherical aberrations are both zero and an area located outside the effective diameter of the second light beam in which a value of an applied voltage for compensating for the first spherical aberration is zero among the plurality of areas.

8. The optical pickup device according to claim 5, wherein electrodes for supplying electricity are not provided to an area in which values of applied voltages for compensating for the first and the second spherical aberrations are both zero and an area located outside the effective diameter of the second light beam in which a value of an applied voltage for compensating for the first spherical aberration is zero among the plurality of areas.

* * * * *